United States Patent [19]

Freeman

[11] Patent Number: 4,830,409
[45] Date of Patent: May 16, 1989

[54] COMPOSITE PIPE COUPLING

[76] Inventor: John F. Freeman, P.O. Box 2119, Big Spring, Tex. 79271

[21] Appl. No.: 85,175

[22] Filed: Aug. 14, 1987

Related U.S. Application Data

[63] Continuation of Ser. No. 3,295, Jan. 14, 1987.

[51] Int. Cl.⁴ .............................................. F16L 33/16
[52] U.S. Cl. .................................. 285/104; 285/113; 285/242; 285/297; 285/331; 285/915
[58] Field of Search ............... 285/331, 297, 294, 245, 285/242, 915, 149 (U.S. only), 101, 104, 106, 113, 255, 259

[56] References Cited

U.S. PATENT DOCUMENTS

| | | | |
|---|---|---|---|
| 2,346,051 | 4/1944 | Seamark | 285/104 X |
| 2,485,976 | 10/1949 | Main | 285/106 |
| 2,843,153 | 7/1958 | Young | 285/288 |
| 2,876,154 | 3/1959 | Usab | 285/915 X |
| 2,920,910 | 1/1960 | Schnabel | 285/294 X |
| 2,926,029 | 2/1960 | St. Clair et al. | 285/256 |
| 2,940,778 | 6/1960 | Kaiser | 285/149 X |
| 3,784,235 | 1/1974 | Kessler et al. | 285/915 X |
| 4,035,002 | 7/1977 | Curtin | 285/915 X |
| 4,137,117 | 1/1979 | Jones | 285/915 X |
| 4,190,479 | 2/1980 | Smith | 285/297 X |
| 4,226,444 | 10/1980 | Bunyan | 285/294 X |
| 4,328,983 | 5/1982 | Gibson | 285/915 X |
| 4,360,288 | 11/1982 | Rutledge, Jr. et al. | 403/267 X |
| 4,506,918 | 3/1985 | Friedrich et al. | 285/423 X |
| 4,569,541 | 2/1986 | Eisenzimmer | 285/294 X |

Primary Examiner—Thomas F. Callaghan
Attorney, Agent, or Firm—Guy E. Matthews

[57] ABSTRACT

A pipe end fitting or coupling including an elongated tubular body having a bore at its first end and a counterbore at its second end with the counterbore being formed as a plurality of frusto-conical grooves and with each of the grooves converging toward its second end. A support sleeve is mounted within the bore and extends throughout the counterbore to form an annular chamber. A cylindrical pipe may be fitted into the annular chamber to form respective chambers with each of the grooves. The respective chambers are filled with a hardenable epoxy resin to complete the end fitting connection.

11 Claims, 2 Drawing Sheets

COMPOSITE PIPE COUPLING

This is a continuation of Application Ser. No. [003,214] 003,295 which was filed Jan. 14, 1987.

FIELD OF THE INVENTION

This invention generally relates to end couplings for pipe or tubing and more particularly pertains to end couplings for pipe or tubing formed of a composite reinforced thermosetting resin such as fiberglass reinforced epoxy resin.

BACKGROUND OF THE INVENTION

Reinforced plastic pipe and tubing are very prevalent. As shown in the *Composite Catalog of Oil Field Equipment and Services,* 1984–1985 Edition, such pipe is advertised for sale by: Ameron B. V., Page 216-1; Ciba-Geigy Pipe Systems, Page 1893; Koch Fiberglass Products, Page 4770; and Wilson Industries, Inc., Page 7780. One form of such plastic pipe is disclosed in U.S. Pat. No. 2,843,153 to Young.

There are a large number of designs for couplers for metal pipe and tubing. Due to the pliable nature of reinforced plastic, the coupling designs for metal pipe generally have proved to be unsuitable. Though couplings have been designed for plastic pipe, there remains a need for a coupler to couple plastic pipe into tanks, receptacles, pipe fittings, and the like and also to other sections of plastic pipe. U.S. Pats. Nos. 1,940,579 to Burtnett, No. 3,680,200 to Terrill, et al., No. 4,415,187 to Hudson, and No. 3,473,833 to Bremer illustrate examples of couplings. No. 4,360,288 to Rutledge, et al. illustrates a steel connector for fiberglass oil well sucker rod.

OBJECTS OF THE INVENTION

One object of the present invention is to provide a coupling for plastic hose or pipe or tubing which may be installed in the field or in a manufacturing plant with equal efficacy.

Another object of the present invention is to provide a pipe coupling which will remain leak proof at operating pressures up to and exceeding the burst pressure of the pipe.

Another object of the present invention is to provide a pipe coupling which may be formed with double ends rather than a single end for a coupling successive sections of plastic pipe.

Yet another object of the present invention is to provide a pipe coupling simply and easily manufactured in large quantity with programmed automatic machines.

SUMMARY OF THE INVENTION

The foregoing and other objects and advantages of the present invention are attained by provision of a composite pipe end fitting which includes an elongated tubular body having a bore formed with internal threads at its first end and a counterbore at its second end with the counterbore being formed as a plurality of frusto-conical grooves with each of the grooves converging toward the second end. A support sleeve is mounted in threaded connection with the internal threads of the body and extends through the counterbore to form an annular chamber formed by the sleeve and the counterbore. The annular chamber is adapted to receive a cylindrical pipe in closely fitting relationship, with the grooves and the pipe forming respective chambers which contain a thermosetting epoxy, for example, which is hardened to form wedge shaped retaining rings to grip the pipe with increasing force commensurate with increasing fluid pressure within the pipe. The pipe may be a composite of fiberglass and epoxy resin. The pipe may also be formed of filament wound plastic such as disclosed in U.S. Pat. No. 2,843,153 referenced above. The coupling may be formed with a connector, such as a threaded connector, to be fastened into another component such as a pipe fitting, a tank or receptacle. The coupling may optionally be formed with a pipe receiving annular chamber at both ends for connecting two pieces of pipe together.

DESCRIPTION OF THE PREFERRED EMBODIMENT

Figure 1:
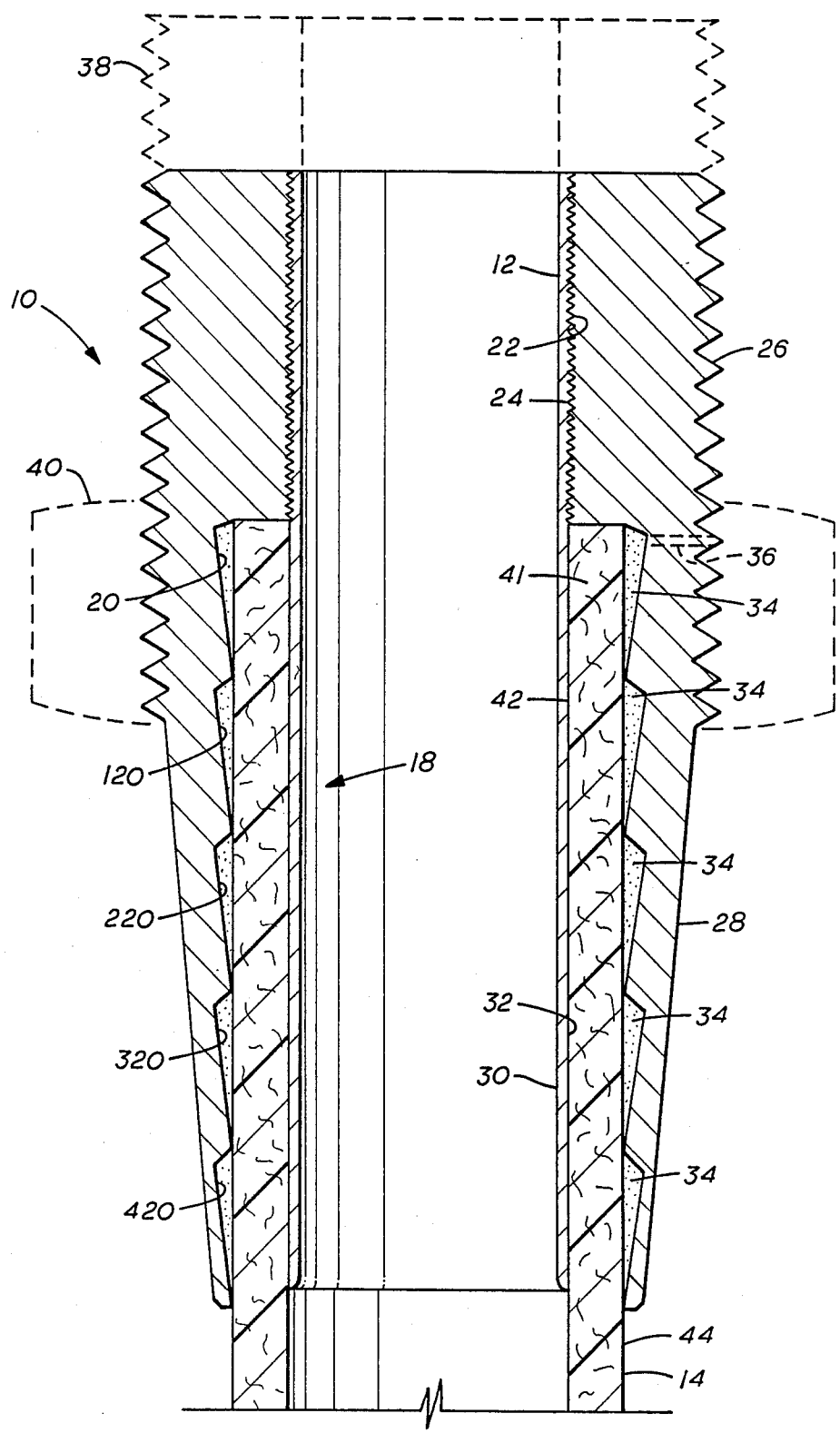
FIG. 1 is a longitudinal sectional view of a coupling of the present invention adapted to receive plastic pipe into one end for connection.

There is shown in FIG. 1 the pipe coupling body 10 of the present invention having a support sleeve 12 adapted to cooperate with the body 10 to form a chamber receiving a composite plastic pipe 14 as described above.

The sleeve 12 may be of about the same length as the body 10 with an inner wall 30 extending throughout its length. A screw thread 22 is formed at a first end of the sleeve 12 for threaded engagement with a thread 24 formed at a first end of the body 10.

A counterbore 18 is formed in the second end of the body 10 with the interior surface of the counterbore being finished as a series of frusto-conical grooves 20, 120, 220, 320, and 420, for example. The sleeve 12 extends into counterbore 18 and the surface 32 of sleeve 12 serves with counterbore 18 to form an annular chamber 41 adapted to receive the pipe 14 in closely fitting relationship. Pipe 14 has an internal surface 42 fitted to the surface 32 of sleeve 12 and an external surface 44 which serves in conjunction with the grooves 20–420 to form a series of annular pockets adapted to be filled with a thermosetting resin 34, such as an epoxy resin.

At the first end of coupling body 10 may be formed a thread 26 suitable for connecting the body 10 into a threaded pipe fitting of some kind or into a tank or receptacle. The second end of the body 10 may be formed as a smooth tapered surface 28 converging toward the end of the body 10.

Shown at dashed lines 36 at the large end of the groove 20, is an alternate fill port for filling the groove 20 and successive grooves with the epoxy 34 as later described.

Figure 2:
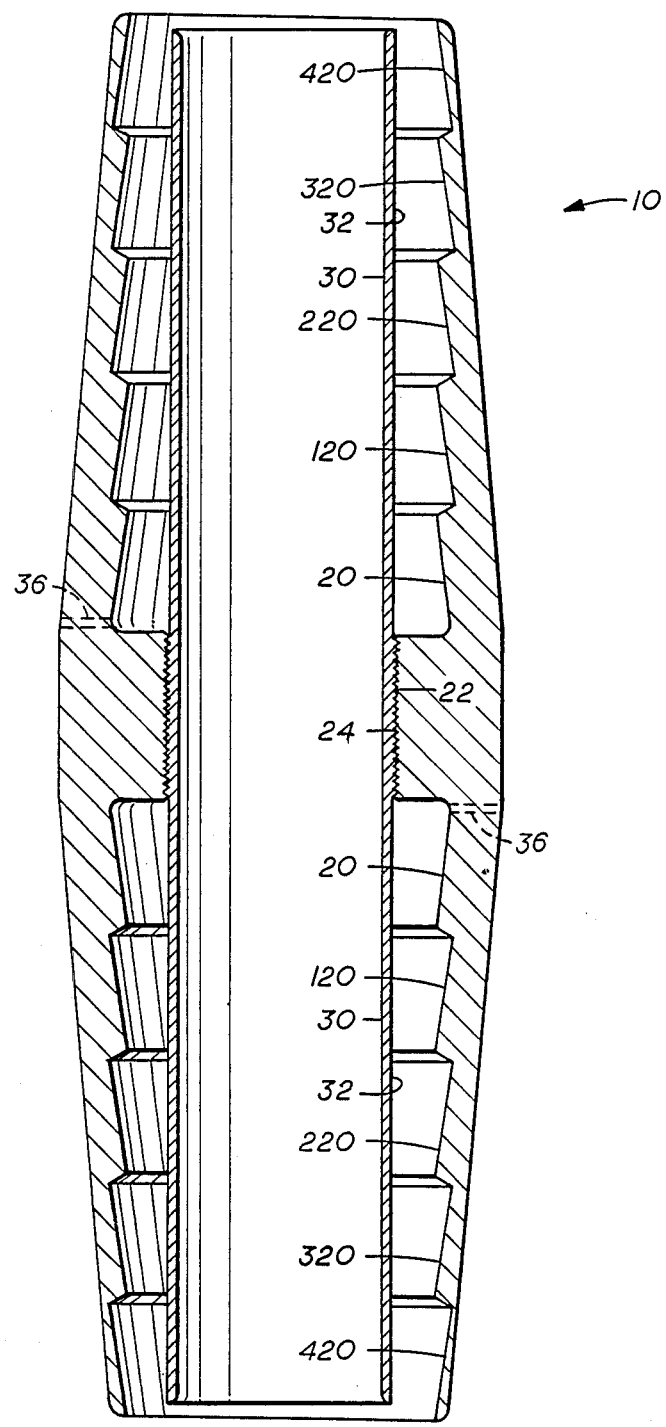
FIG. 2 is a longitudinal sectional view of a coupling adapted to receive plastic pipe at both ends.

The dashed lines 38 and 40 indicate alternate constructions for the body 10. The dashed lines 40 indicate an alternate larger hexagonal diameter to provide wrench flats for assembly and disassembly of pipe body 10 with other components. When the hex body 40 is provided, the dashed lines 38 indicates an extended length of the body 10 and the threads 26. Alternately, the dashed lines 38 indicate the option that the upper end of the body and the sleeve 12 may be extended to form a mirror image of the structure previously described and shown at the second end of the body 10 and sleeve 12, thus providing a double ended coupling as shown in FIG. 2 for joining two pieces of pipe such as the pipe 14.

As an alternate construction, the sleeve 12 may be fitted within the bore 18 of the body 10 and connected into fixed position as with silver solder or brass brazing to eliminate the threads 22 and 24. Also, the threaded connector 26 as shown can be a boltable flange, mounting ferrule, or other kind of pipe or tubing connection commonly known in the art.

ASSEMBLY AND USE OF THE PREFERRED EMBODIMENT

First, the sleeve 12 is installed in the body 10 at its first end as by threaded connection or brazing as previously described. The body 10 is then positioned such that a thermosetting resin, such as an epoxy resin, may be poured into the annular cavity 41 formed by the sleeve 12 and the counterbore 18. The body 10 may then be tilted off the vertical sufficiently for the resin to be at a level inclined with respect to the body 10 and the body rotated around slowly in order to wet the external surface 32 of sleeve 12 and the internal surfaces within the counterbore 18 with the epoxy. Separately, the external surface 44 of the pipe 14, and the internal surface 42, may be wetted with the liquid epoxy resin.

The pipe 42 is then placed into the annular cavity and rotated slightly for seating. The resin 34, which has been placed into the annular cavity in measured quantity, is forced by the pipe 14 into the grooves 20–420 to completely fill such grooves. The epoxy 34 is used in measured amount to prevent very much excess resin being forced out of the annular cavity or chamber 41 when the pipe 14 has been inserted and seated.

When assembled as shown in FIG. 1 and installed in a pressurized fluid system, the fluid pressure contained within the pipe 14 will tend to try to escape in between the surface 32 of sleeve 12 and the surface 42 of the hose pipe 14. Concurrently, the same fluid pressure is being applied across the circular cross sectional area defined by the pipe wall 42 which is tending to push the pipe 14 out of the chamber 41. The force applied by the fluid pressure across such cross sectional area is resisted by the conical bodies of the resin 34 as retained within the grooves 20–420, and minute movement of these conical shapes or wedges will force the wedges into compression against the pipe 14 and thereby more closely grip the hose against expulsion.

Fluid as may leak between the surface 32 of sleeve 12 and the inner surface 42 of pipe 14 will tend to accumulate at the bottom of chamber 41 to impinge against the combined annular surface of the end of pipe 14 and the epoxy wedge contained within the groove 20, which will act as a piston in response to any pressure applied by the fluid to drive the wedge into tighter gripping about the pipe 14.

There may be times when it is desirable to insert the pipe 14 into the chamber 41 during installation of the fitting body 10 and thereafter apply the epoxy resin within the groove 20–420. The port 36 indicated by dashed lines may be used to accomplish this filling. An epoxy resin 34 may be forced or pumped into through the orifice or port 36 and successively fill the grooves 20–420 as needed. Alternately, a fill port might be provided for each of the grooves 20–420 and each groove individually filled if the particular size of the fitting would benefit from this procedure. After filling of the grooves with the resin 34, the ports 36 would be closed off as with threaded plugs.

It will be apparent that other changes and modifications, in addition to those herein noted, may be made to the embodiment as illustrated and described without departing from the spirit and purview of the invention as pointed out and specified in the appended claims.

What is claimed is

1. A composite pipe end fitting for composition pipes comprising:
   (a) an elongated tubular body having a bore at its first end and a counter bore at its second end, said counter bore being formed as a plurality of frusto-conical grooves with each of said grooves converging towards said second end;
   (b) a support sleeve means sealingly secured in said bore and extending through said counter-bore to form an annular chamber within said counter-bore;
   (c) said annular chamber receiving a cylindrical pipe in close fitting relationship but not fluid tight for fluid under pressure;
   (d) said grooves and the outer walls of said pipe forming respective chambers to contain a hardenable liquid;
   (e) a hardenable liquid adapted for introduction within said annular chamber to form a series of annular hardened wedges to resist tensile forces when applied to the fitting; and,
   (f) a fluid passage that allows: fluid under pressure to leak between the outer face of the support sleeve within the annular chamber and the inner wall of the pipe within the annular chamber, and to accumulate in the bottom of the annular chamber to impinge against the annular wedge nearest the first end of the tubular body, and to drive said annular wedge as a piston to grip the pipe tighter and further seal the connection in response to said leaking fluid under pressure.

2. The fitting of claim 1 wherein said pipe is a composite of fiberglass and epoxy resin.

3. The fitting of claim 1 wherein said pipe is filament wound plastic.

4. The fitting of claim 1 wherein said pipe is a reinforced thermosetting resin.

5. The fitting of claim 1 wherein the first end of said body has connection means formed for connection to the flow passage of another element.

6. The fitting of claim 5 wherein said connection means comprises a second annular chamber as defined in axial opposition to and as a mirror image of said first annular chamber as defined.

7. The fitting of claim 1 wherein said support sleeve is threadedly connected within said bore.

8. The fitting of claim 1 wherein said hardenable liquid is an epoxy resin.

9. The fitting of claim 2 wherein said hardenable liquid is an epoxy resin.

10. The fitting of claim 4 wherein said hardenable liquid is an epoxy resin.

11. The fitting of claim 1 wherein said support sleeve is connected within said bore by means of brazing.

* * * * *